(12) United States Patent
Calza et al.

(10) Patent No.: US 9,121,293 B2
(45) Date of Patent: Sep. 1, 2015

(54) ROTOR FOR TURBOMACHINES

(75) Inventors: Paolo Calza, Rivalta di Torino (IT);
Rosario Grillo, Rivalta di Torino (IT);
Sergio Salvano, Turin (IT)

(73) Assignee: AVIO S.p.A., Turin (IT)

( * ) Notice: Subject to any disclaimer, the term of this patent is extended or adjusted under 35 U.S.C. 154(b) by 799 days.

(21) Appl. No.: 13/255,639

(22) PCT Filed: Mar. 9, 2009

(86) PCT No.: PCT/IT2009/000085
§ 371 (c)(1),
(2), (4) Date: Dec. 21, 2011

(87) PCT Pub. No.: WO2010/103551
PCT Pub. Date: Sep. 16, 2010

(65) Prior Publication Data
US 2012/0099962 A1    Apr. 26, 2012

(51) Int. Cl.
*F04D 29/66* (2006.01)
*F01D 5/26* (2006.01)
*F01D 5/22* (2006.01)

(52) U.S. Cl.
CPC .. *F01D 5/26* (2013.01); *F01D 5/22* (2013.01); *F05D 2260/96* (2013.01)

(58) Field of Classification Search
USPC .......... 415/119; 416/106, 140, 248, 500, 190, 416/191
See application file for complete search history.

(56) References Cited

U.S. PATENT DOCUMENTS

| | | | | |
|---|---|---|---|---|
| 4,101,245 A | * | 7/1978 | Hess et al. | 416/190 |
| 5,156,528 A | * | 10/1992 | Bobo | 416/190 |
| 5,478,207 A | * | 12/1995 | Stec | 416/219 R |
| 5,513,955 A | | 5/1996 | Barcza | |
| 5,522,705 A | | 6/1996 | Elaini et al. | |
| 6,478,544 B2 | * | 11/2002 | Brandl et al. | 416/190 |
| 7,214,034 B2 | * | 5/2007 | Giot et al. | 416/193 A |

FOREIGN PATENT DOCUMENTS

| | | |
|---|---|---|
| EP | 0509838 | 10/1992 |
| EP | 0851096 | 7/1998 |
| EP | 1164253 | 12/2001 |
| EP | 1529926 | 5/2005 |
| EP | 1635037 | 3/2006 |

OTHER PUBLICATIONS

International Search Report and Written Opinion in PCT Appln. No. PCT/IT2009/000085, mailed on Jul. 7, 2010 [10 pages].

\* cited by examiner

*Primary Examiner* — Dwayne J White
*Assistant Examiner* — Justin Seabe
(74) *Attorney, Agent, or Firm* — Davidson Berquist Jackson & Gowdey, LLP

(57) ABSTRACT

A rotor for turbomachines having a plurality of blades, and a damping member housed inside a chamber respectively arranged between each pair of adjacent blades of the rotor. The damping member is pushed, in use, by the centrifugal force against two surfaces, each of which is carried by a respective blade, which limit the respective chamber in a radially outward direction. The damping member is cup-shaped and provided with a base wall facing the two surfaces of the chamber and has three support bosses provided on one surface so that at least one of the three will contact one of the two surfaces and at least one other will contact the other of the two surfaces.

14 Claims, 4 Drawing Sheets

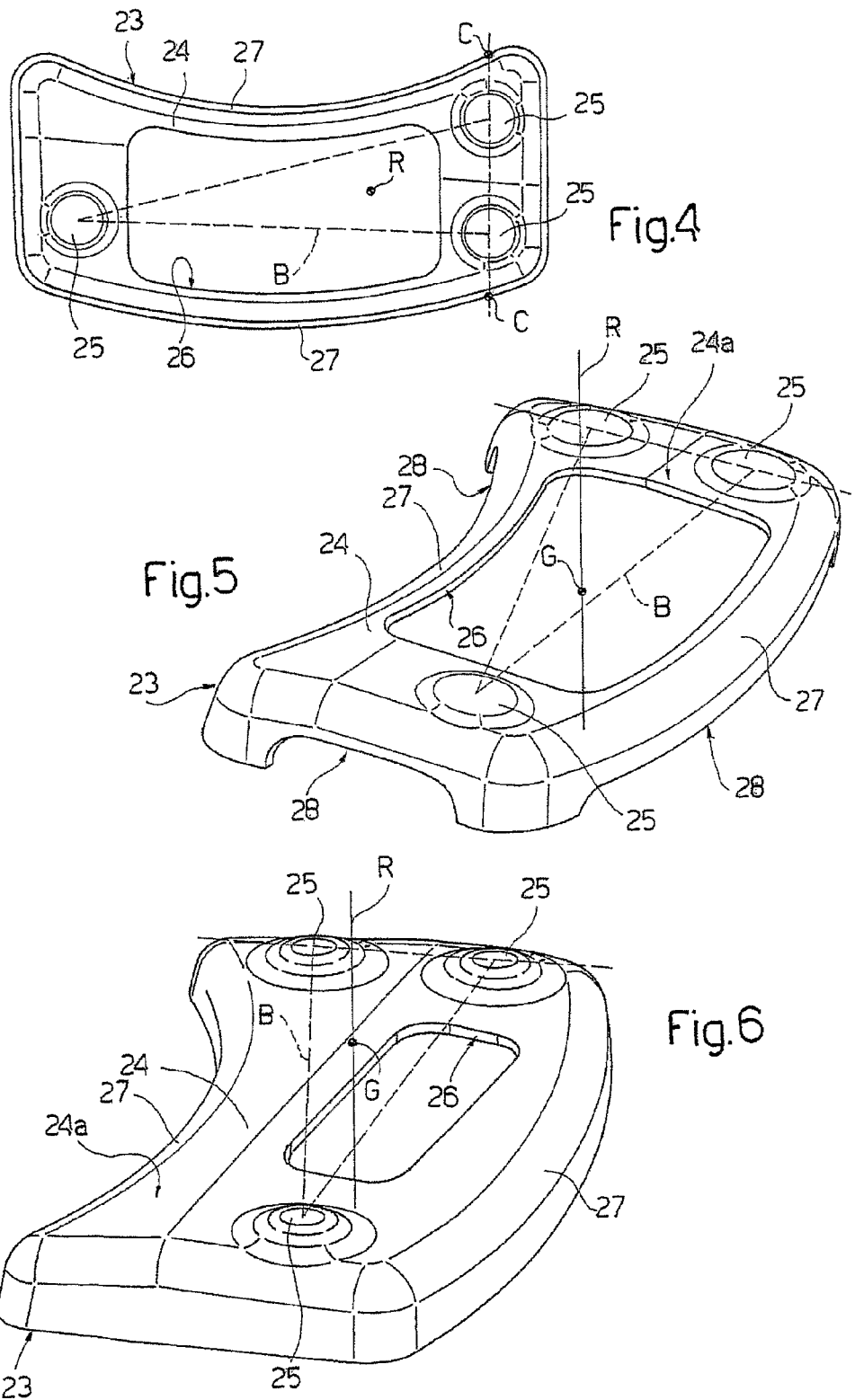

ROTOR FOR TURBOMACHINES

TECHNICAL FIELD

The present invention relates to a rotor for turbomachines, the rotor being of the type comprising a central body having an axis and suitable to rotate about said axis; at least one blade row surrounding the central body and which turns with the central body about the axis; and a damping system to eliminate any vibratory motion of the blades; the blades of each pair of adjacent blades defining, between them, a housing chamber for a relative said a damping system; and each chamber being limited, in a radially outwards direction, by a relative closing wall comprising two portions separated by an air gap and belonging one to one and the other to the other of the blades of the relative pair of adjacent blades.

BACKGROUND ART

With the known rotors of the type described above, there is a possibility, during use, of significant phase displacement between the vibration level of one blade and that of an adjacent blade, and of portions, separated from one another by said air gap, of the blades of each pair of adjacent blades nullifying said air gap and repeatedly colliding. The damping system mentioned above is arranged inside each chamber to frictionally cooperate with both portions of the closing wall of the relative chamber and to frictionally dampen said vibrations.

However, a drawback of the known rotors of the type described above is that the result described above is not always achieved since, in practice, it is not always possible to guarantee the concurrent contact between the damping system and both portions of the closing wall of the relative chamber.

DISCLOSURE OF INVENTION

The object of the present invention is to provide a rotor for turbomachinery, which overcomes the drawback described above.

According to the present invention there is provided a rotor for turbomachinery according to that described herein.

BRIEF DESCRIPTION OF THE DRAWINGS

The present invention will now be described with reference to the accompanying drawings, illustrating a non-limiting embodiment thereof, in which:

FIGS. 4 and 5 are a plan and, respectively, a perspective view, and both on an enlarged scale, of a further detail of FIG. 1;

FIG. 6 is a perspective view of an alternative embodiment of the detail of FIG. 4;

BEST MODE FOR CARRYING OUT THE INVENTION

Figure 1:
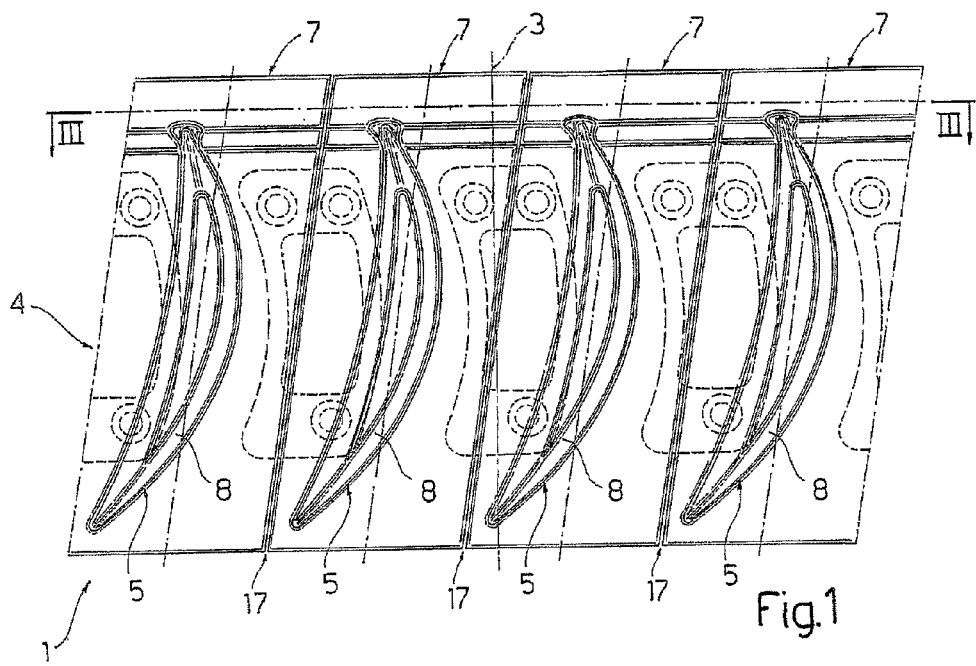
FIG. 1 is a plan view and illustrating an operating configuration of a portion of a preferred embodiment of the rotor according to the present invention.
Figure 2:
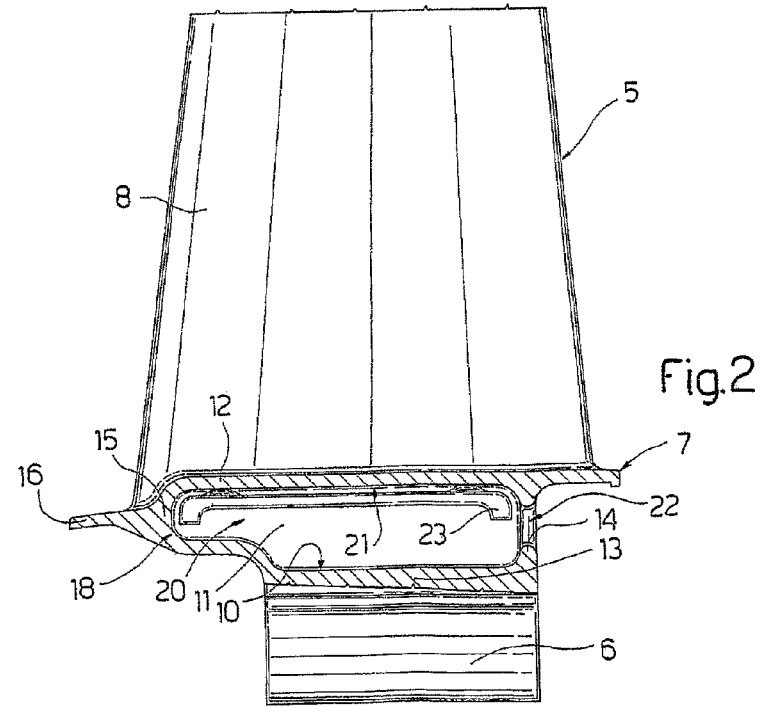
FIG. 2 is a side and partially cross-sectional view of a first detail of FIG. 1.
Figure 3:
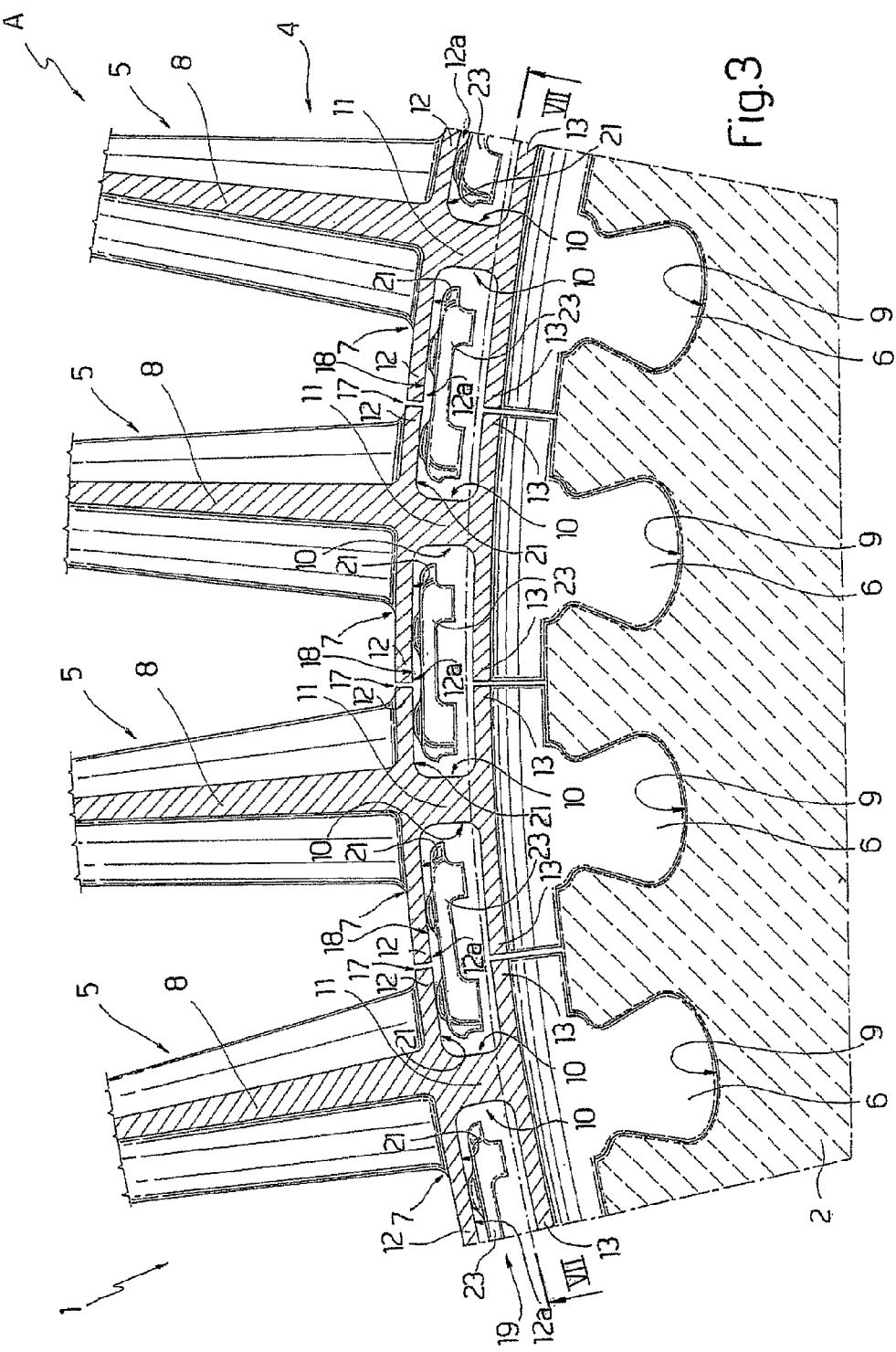
FIG. 3 is a cross-sectional view along the line of FIG. 1.
Figure 7:
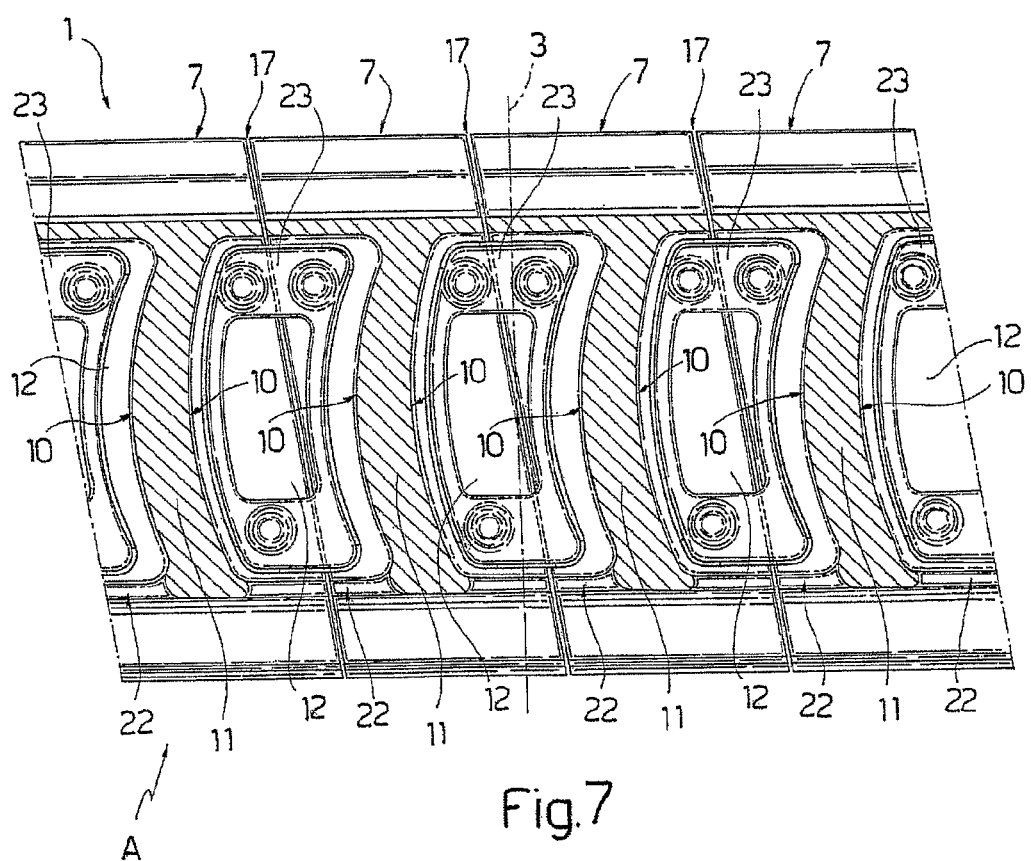
FIG. 7 is a cross-sectional view along a line VII-VII of FIG. 3.

In FIGS. 1, 2 and 3, designated as a whole by number 1 is a rotor of a turbomachine A, said rotor 1 comprising a central body 2 mounted so as to rotate about its own axis 3 and a row 4 of radial blades 5 arranged side by side.

Each blade 5 comprises a root 6, a base 7 and a wing 8; the root 6 of each blade 5 is axially inserted into a respective peripheral slot 9 of the central body 2 so that the blade 5 is fixed radially and circumferentially to the central body 2 by means of a shape-fit connection; while, both the base 7 and the wing 8 of each blade 5 extend radially to the outside of the central body 2.

Each base 7 protrudes circumferentially with respect to the relative wing 8, which is the outermost portion of the relative blade 5 and extends radially towards the outside from the base 7.

The base 7 (FIG. 3) of each blade 5 comprises two opposing cup-shaped bodies 10, which have in common a base wall 11 arranged radially with respect to the axis 3 and are provided with concavities facing opposite directions and outwardly in a circumferential direction along the row 4. Each cup-shaped body 10 faces and is aligned with a corresponding cup-shaped body 10 of an adjacent blade 5 and comprises a radially external wall 12 and a radially internal wall 13 both circumferentially oriented and substantially parallel to one another and perpendicular to the base wall 11. Each cup-shaped body 10 also comprises a lateral front wall 14, which is perpendicular to the walls 12 and 13 and to the base wall 11 and extends from a front extremity of the radially internal wall 13 and an intermediate point of the radially external wall 12, and a lateral rear wall 15, which is perpendicular to the walls 12 and 13 and to the base wall 11, is substantially parallel to the lateral front wall 14 and is provided externally with an axial appendix 16.

Each cup-shaped body 10 is separated from the cup-shaped body 10 facing it of an adjacent blade 5 by an air gap 17 extending along the free edges of the relative walls 12-15 and defines, with the cup-shaped body 10 facing it of said adjacent blade 5, a container 18, which is limited in a radially outward direction, by a closing wall 12a defined by the relative two radially external walls 12 of the relative cup-shaped bodies 10. Each container 18 forms, with all the remaining containers 18, a ring 19 coaxial to the axis 3 and covering and protecting the central body 2, and is provided with an internal chamber 20, which is divided transversely in two parts by the air gap 17, is limited, in a radially outward direction, by the internal surfaces 21 of the relative two radially external walls 12 and axially communicates with the outside through a slit 22 obtained through the relative two lateral front walls 14 perpendicularly to the base walls 11.

Each chamber 20 houses internally a respective damping member 23, which, according to that illustrated in FIGS. 4 and 5, is cup-shaped, is arranged inside the chamber 20 with its concavity facing radially inwards and has a substantially flat base wall 24, from one radially external surface 24a of which three bosses 25 protrude, facing the surfaces 21 and arranged, in the example that is illustrated, so as to form the vertices of a right-angled triangle, illustrated by the dashed line and indicated by the letter B, a longer leg of which is arranged in a position that is substantially parallel to the plane of the relative air gap 17, and a shorter leg of which, arranged in a position that is substantially transversal to the air gap 17, intersects, if extended, two opposite edges of the base wall 24 in respective points C.

The bosses 25 are arranged so as to meet the following condition:

at least one of the bosses 25 must be facing one of the relative surfaces 21 and at least another of the bosses 25 must be facing the other of the surfaces 21.

In order to meet this condition, the distance between each boss 25 arranged along the shorter leg of the triangle B and the point C furthest from it is always greater than the width, measured circumferentially of each of the two internal surfaces 21.

In order to adjust the weight of the damping member 23 for reasons that will be explained later, through the base wall 24 of the damping member 23 is obtained at least one aperture 26 of variable dimensions. In the example that is illustrated, the base wall 24 is provided with a single aperture 26, but according to alternative embodiments that are not illustrated, there may be more than one aperture 26 and these may be variably distributed on the base wall 24. The edges of the base wall 24 are joined to the radially external edge of a lateral annular wall 27, which is suitable to prevent, in use, the damping member 23 from becoming stuck inside the relative chamber and from becoming radially jammed. The lateral wall 27 is provided with axial vents 28, which, with the aperture 26, help to adjust the weight of the damping member 23 and stiffen the structure of said member 23.

The transversal dimensions of the damping member 23 are such to allow to the member 23 itself to slide radially and, preferably, also axially inside the relative chamber 20.

Preferably, moreover, the dimensions of each damping member 23 are determined so as to prevent them from rotating about themselves inside the respective chamber 20.

Preferably, lastly, the damping member 23 is made by means of a moulding process from a flat metal sheet, in particular it is made of HASTELLOY-X or HAYNES-188 and the bosses 25 are coated with anti-wear material.

FIG. 6 illustrates a damping member 123 similar to the damping member 23, but of a different weight, a different shape and an aperture 26 (but still preferably in accordance with the two conditions described above) that differs in terms of its shape, dimensions and position from the aperture 26 of the damping member 23.

Likewise, a set of damping members (not illustrated) can be provided, each of which is different from the damping member 23 and 123, but is of a suitable shape and dimensions to enable it to be inserted into a chamber 20, is provided with the three bosses 25 and meets the conditions described previously.

In use, to assemble the rotor 1, the blades 5 are arranged one beside the other so as to form the row 4; then, each damping member 23 is inserted into the respective chamber 20 of the relative container 18. The damping member 23 is inserted in such a way that the bosses 25 face the internal surfaces 21 of the respective chamber 20. Once formed, the row 4 of blades 5 is mounted axially on the central body 2 inserting the roots 6 of the blades 5 inside the relative peripheral slots 9 of the central body 2.

When the row 4 of blades 5 is made to rotate, each damping member 23 is pushed, due to the centrifugal force, against the inside surfaces 21 of the external walls 12 of the relative chamber 20 so as to straddle the relative air gap 17.

In that respect it is important to note that the presence of the three bosses 25, at least one of which, as mentioned previously, is arranged so as to be in contact with one of the two internal surfaces 21 and at least another of which is arranged so as to be in contact with the other of the two internal surfaces 21 not only guarantees an isostatic support for the damping member 23 on the two internal surfaces 21, but also ensures the contact of said damping member 23 with both of the internal surfaces 21 in any operating condition and, in particular, regardless of the roughness of said internal surfaces 21.

Moreover, the presence of a finite number of bosses 25 ensures that each damping member 23 always adheres to the internal surfaces 21 at set points as defined in the design.

The friction that is generated in correspondence with the bosses 25 due to the vibratory motion of the blades 5 and of the subsequent relative motion between the damping member 23 and the internal surfaces 21 of the relative two adjacent bases 7 dissipates energy in the form of heat and thus dampens the vibrations of the relative blades 5.

Since the frictional force that is exerted depends on the weight of the damping members 23, the number of turns of the row 4 being equal, it is possible to adjust the weight of said damping members 23 by varying the dimensions and position of the apertures 26 in order to achieve the desired damping effect.

In order to make sure that the pressures exerted by the bosses 25 of each damping member 23 on the relative internal surfaces 21 are substantially the same, the positions and the dimensions of the relative aperture 26 and of the relative axial vents 28 are calculated in order that the centre of gravity G of the damping member 23 is arranged on a radius R intersecting the triangle B.

Each damping member 23 can be chosen, to meet the specific requirements, from among a plurality of damping members 23 with different geometries, in particular, in terms of the position of the bosses, weight and position of the centre of gravity, the latter both being modifiable, advantageously, through the use of apertures 26 having different positions, dimensions and shapes as required.

In that respect it is important to note that the damping members 23 do not need to be housed in specific seats or chambers; that each damping member 23 can be inserted into a generic chamber 20 with dimensions greater than those of said damping member 23; and that, with the central body 2 still, i.e. at rest, each damping member 23 can float freely and arrange itself at random inside the respective chamber 20, but always with the characteristic that during operation the three bosses are in contact with the blades: two with one blade and one with the other.

From the above description it follows that the damping members 23, once selected, can be inserted into the chambers 20 of any existing rotor 1 in order to eliminate the vibrations, which are effectively generated, during operation, on the blades 5 of the existing rotor 1.

Lastly, it is important to note that the damping members of a same rotor are not necessarily all the same, but can be different from one another and used to enable the dynamic balancing of the relative rotor 1.

The invention claimed is:

1. A rotor for turbomachines (A), the rotor comprising a central body having an axis and suitable to rotate about the axis itself; at least one row of blades surrounding the central body and which rotate with the central body about the axis; and a damping system to reduce any vibratory motion of the blades; the blades of each pair of adjacent blades defining, between them, a housing chamber containing part of said damping system; and each chamber being limited, in a radially outward direction, by a relative closing wall comprising two portions separated by an air gap and belonging one to one and the other to the other of the blades of the relative pair of adjacent blades; wherein the damping system comprises a cup shaped damping member mounted floatingly, at least in a radial direction, inside each chamber and having a substantially flat upper surface, and three bosses projecting radially outwards from the substantially flat upper surface; at least a first of the three bosses facing one of the two portions of the closing wall, and at least a second of the three bosses facing the other of the two portions of the closing wall.

2. The rotor according to claim 1, wherein each blade projects radially outwards with respect to the central body and comprises a root for coupling to the central body, a base and a wing; the bases of the blades defining, together, a ring comprising said walls; and said chambers being defined on the inside of the ring.

3. The rotor according to claim 2, wherein the base of each blade comprises two opposing cup-shaped bodies, which are provided with concavities facing in opposite directions and outwardly in a circumferential direction along the ring; each cup-shaped body facing and being aligned with a corresponding cup-shaped body of an adjacent blade to define the relative chamber.

4. The rotor according to claim 1, wherein said first and second bosses are arranged along a straight line substantially transversal with respect to the relative air gap; said straight line intersecting two opposite edges of the relative substantially flat upper surface at respective points of intersection (C); and each of said first and second bosses being arranged at a distance furthest from the point of intersection (C) that is greater than a width, measured in a circumferential direction, of each of the relative said two portions.

5. The rotor according to claim 1, wherein the three bosses are arranged so as to form the vertices of a triangle (B) on the substantially flat upper surface.

6. The rotor according to claim 5, wherein the triangle (B) is a right-angled triangle (B), a shorter leg of which is substantially transversal with respect to the air gap.

7. The rotor according to claim 5, wherein the weight and of the position of a center of gravity (G) of each damping member is modifiable.

8. The rotor according to claim 7, wherein the center of gravity (G) is adjustably positioned on a radius intersecting the triangle (B).

9. The rotor according to claim 7, wherein each damping member is arranged inside the relative chamber with its concavity facing radially inwards, which is limited externally by the relative radially external surface.

10. The rotor according to claim 9, wherein the weight is adjusted, at least in part, by modifying said substantially flat upper surface.

11. The rotor according to claim 10, wherein the adjustment of the weight and the position of the center of gravity (G) includes providing at least one aperture through said base wall.

12. The rotor according to claim 1, wherein the damping system also provides dynamic balancing of said rotor.

13. The rotor according to claim 1, wherein at least one of said bosses is coated with an anti-wear material.

14. A damping system for turbomachinery that incorporates a rotor having a plurality of blades, each blade having a root and a base; each rotor including part of an internal chamber established between adjacent rotors and located between the base and the root of each of the plurality of blades; the internal chamber including two adjacent and spaced apart closing wall portions, the damping system including a cup shaped damping member positioned within said internal chamber so as to float therein and having substantially flat, radial surface, and three bosses projecting radially outwards from the substantially flat, radial surface; at least a first of the bosses facing one of the two adjacent and spaced apart closing wall portions and a second one of the bosses facing the other of the two adjacent and spaced apart closing wall portions.

* * * * *